United States Patent [19]

Lin

[11] Patent Number: 5,224,571
[45] Date of Patent: Jul. 6, 1993

[54] EASILY ASSEMBLED BRAKE-FORCE ADJUSTING MEANS FOR VEHICLE BRAKE

[76] Inventor: Chao-Yi Lin, P.O. Box 55-1670, Taipei, Taiwan

[21] Appl. No.: 757,589

[22] Filed: Sep. 11, 1991

[51] Int. Cl.⁵ ............................................... B62L 1/14
[52] U.S. Cl. .............................. 188/24.19; 188/196 M
[58] Field of Search ............. 188/24.19, 24.21, 196 M, 188/210, 65.1; 74/501.5 R, 502.6, 500.5

[56] References Cited

U.S. PATENT DOCUMENTS

| 1,542,290 | 6/1925 | Dumont | 188/196 M |
| 2,041,385 | 5/1936 | Van Laanen, Jr. | 188/196 M |
| 4,026,390 | 5/1977 | Yoshigai | 188/24.21 |
| 4,850,456 | 7/1989 | Chi | 188/24.19 |
| 4,896,750 | 1/1990 | Tseng | 188/24.19 |

Primary Examiner—Matthew C. Graham

[57] ABSTRACT

A brake force adjuster for a vehicle brake especially for a bicycle brake includes a hanger holding a hanging wire secured with a pair of brake shoes for operatively clamping a wheel rim of a vehicle wheel for braking purpose, an adjustable locking latch resiliently tensioned on the hanger normally frictionally locking a braking wire remotely connected to a brake lever to be operated by a vehicle driver, and a locking bolt locking the braking wire on the hanger. When unlocking the locking bolt and pulling the adjustable locking latch, the hanger may be freely moved along the braking wire for adjusting a clamping force of the braking shoes. After releasing the locking latch, the locking latch will resiliently frictionally lock the braking wire which is then firmly locked by the locking bolt also formed on the hanger. Therefore a brake force adjuster of a vehicle brake can be easily assembled and adjusted.

1 Claim, 4 Drawing Sheets

EASILY ASSEMBLED BRAKE-FORCE ADJUSTING MEANS FOR VEHICLE BRAKE

BACKGROUND OF THE INVENTION

A conventional brake force adjuster of a bicycle brake was disclosed in a Taiwan Utility Model patent application with a serial number of 77209419 laid open on Mar. 11, 1989 (Publication No. 109705) of which a publication copy is enclosed in this application for an examination reference. A brake wire 2 in such a conventional adjuster can be pulled downwardly for adjusting a brake force of a bicycle brake from a chuck 723 to disengage from a pair of steel balls 725 which are retained in the chuck 723 and normally coupled with a ball-retaining plug 724 secured in a cylindrical base 721 mounted on a holding plate 71 secured with a hanger 7 having a hanging wire 4 wound on a pulley 734 fixed on the hanger 7. Upon the downward pulling of the brake wire 2, the hanger 7 with the hanging wire 4 will be relatively raised to bias a pair of brake shoes 5 for clamping a wheel rim 6 more firmly in order for increasing a brake force of the bicycle.

However, it still has the following drawback:

The wire 2 is locked or unlocked in the hanger 7 by the pair of balls 725. It is very difficult to assemble the balls 725 in the chuck 723 to be retained by the plug 724. The two balls 725 are easily slid away from the chuck 723 and plug 724 during their assembly or operation, causing a production difficulty and operational inconvenience.

The present inventor has found the drawbacks of the conventional brake force adjuster, and invented the present easily assembled brake-force adjusting means for a vehicle brake, especially for a bicycle brake.

SUMMARY OF THE INVENTION

The object of the present invention is to provide a brake force adjuster for a vehicle brake especially for a bicycle brake including a hanger holding a hanging wire secured with a pair of brake shoes for operatively clamping a wheel rim of a vehicle wheel for braking purpose, an adjustable locking latch resiliently tensioned on the hanger normally frictionally locking a braking wire remotely connected to a brake lever to be operated by a vehicle driver, and a locking bolt locking the braking wire on the hanger, whereby upon an unlocking of the locking bolt and upon a pulling of the adjustable locking latch, the hanger may be freely moved along the braking wire for adjusting a clamping force of the braking shoes; and upon a releasing of the locking latch, the locking latch will resiliently frictionally lock the braking wire which is then firmly locked by the locking bolt also formed on the hanger, thereby providing a brake force adjuster of a vehicle brake easily assembled and adjusted.

DETAILED DESCRIPTION

Figure 1:
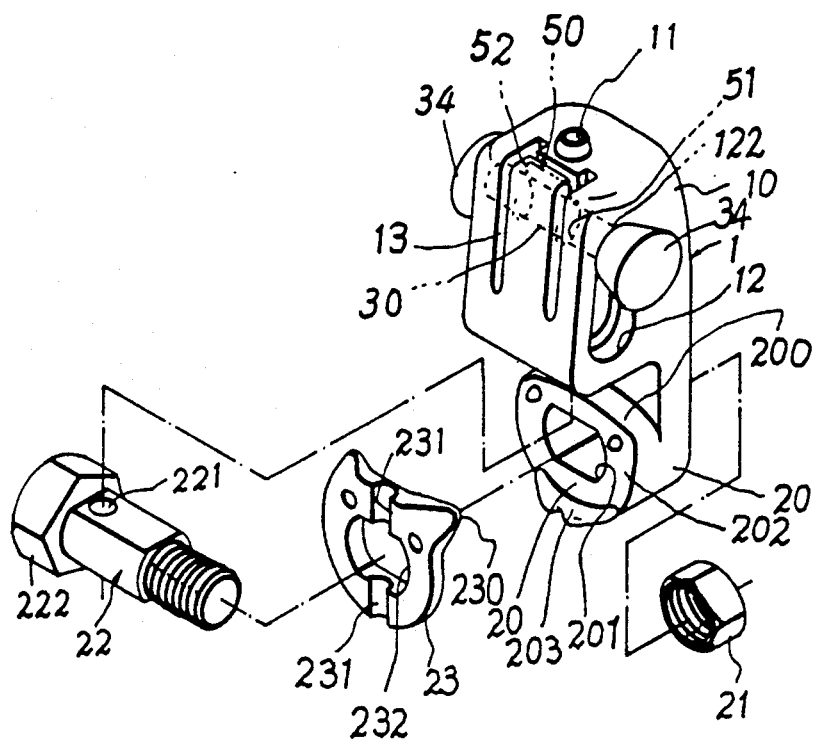
FIG. 1 is an exploded view of the present invention.
Figure 2:
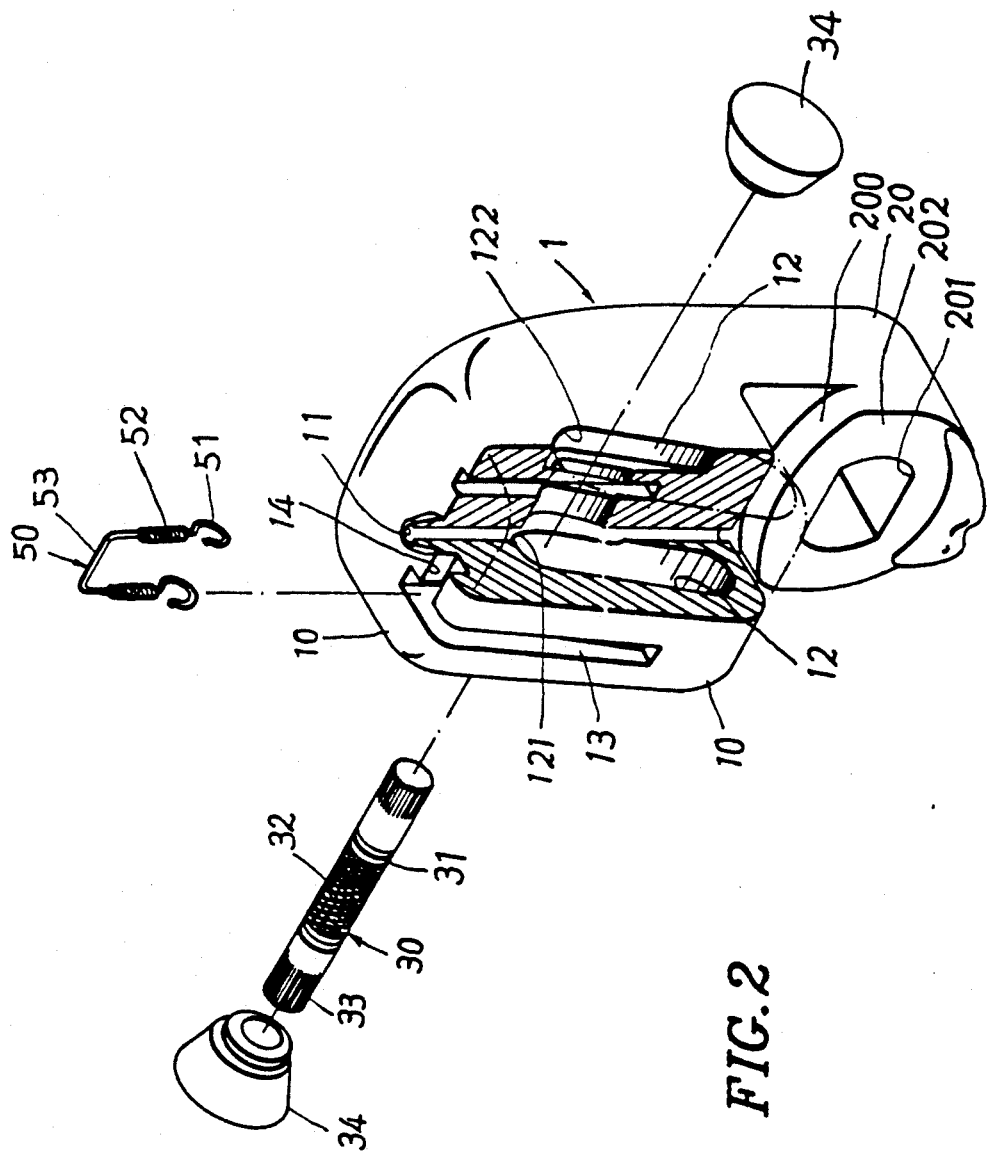
FIG. 2 is a partially cut-away illustration of the present invention.
Figure 3:
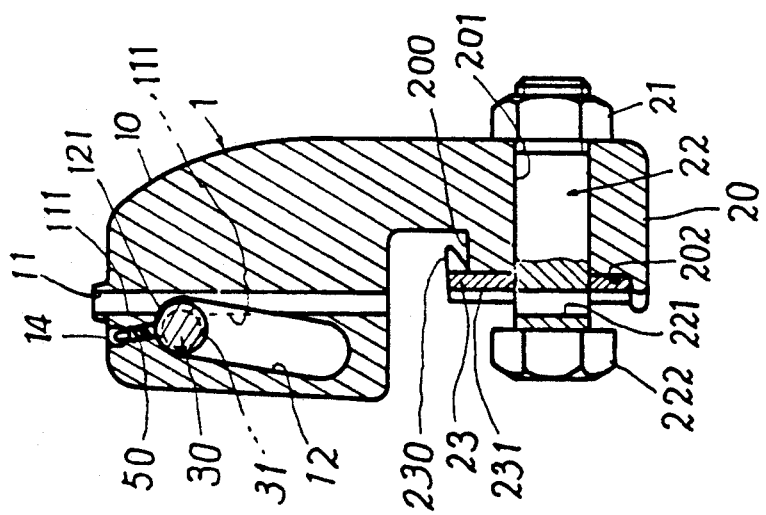
FIG. 3 is a sectional drawing of the present invention.

As shown in FIGS. 1-5, the present invention comprises: a hanger 1 having a sliding block portion 10 formed on an upper portion of the hanger 1 and a hanging block portion 20 formed on a lower portion of the hanger 1, a braking wire 2 passing through the hanger 1, a hanging wire 3 hanged on the hanger 1 to be secured with a pair of brake shoes operatively braking a vehicle wheel (not shown), an adjustable locking latch 30 resiliently tensioned on the hanger 1, and a locking bolt 22 normally locking the braking wire 2 with the hanger 1.

The sliding block portion 10 includes: a hanger wire hole 11 longitudinally formed through a central portion of the sliding block portion 10 defining an inside cylindrical wall 111 in the wire hole 11, an inclined slot 12 slidably engageable with the adjustable locking latch 30 longitudinally formed through the sliding block portion 10 projectively forming an acute angle with the hanger wire hole 11 and having a central inner upper portion 121 of the inclined slot 12 intersected with the inside cylindrical wall 111 of the hanger wire hole 11, a pair of spring slots 13 longitudinally formed in the sliding block portion 10 communicated with the slot 12 and projectively disposed on two opposite sides of the central hanger wire hole 11 for slidably holding two spring members 52 of a spring means 50 in the two spring slots 13, and an upper groove 14 laterally recessed in an upper portion of the sliding block portion 10 for holding a horizontal bar portion 53 of the spring means 50.

The hanging block portion 20 is recessed inwardly in a lower portion of the hanger 1 to have an outer vertical surface 202, to which the hanger wire hole 11 is generally projectively tangential thereto, and is formed with a bolt hole 201 transversely through the hanging block portion 20 for inserting the locking bolt 22 in the bolt hole 201, and formed with an arcuate portion 200 on an upper portion of the hanging block portion 20 to be wound by the hanging wire 3 secured to the pair of brake shoes for operatively braking a vehicle wheel rim (not shown).

The locking bolt 22 includes: a bolt wire hole 221 longitudinally formed through the bolt 22 adjacent to a bolt head 222, and a nut 21 for fastening the bolt 22 on the hanging block portion 20.

A retaining washer 23 retained on a bottom extension 203 of the block portion 20 is packed between the bolt head 222 and the outer vertical surface 202 of the hanging block portion 20, and includes: a central bolt hole 232 for passing the bolt 22 therethrough, a wire groove 231 longitudinally recessed in the washer projectively aligned with the bolt wire hole 221 formed in the locking bolt 22 and engageable with the braking wire 2, and a pair of lugs 230 protruding inwardly for clamping the hanging wire 3 on the arcuate portion 200 of the hanging block portion 20.

Figure 5:
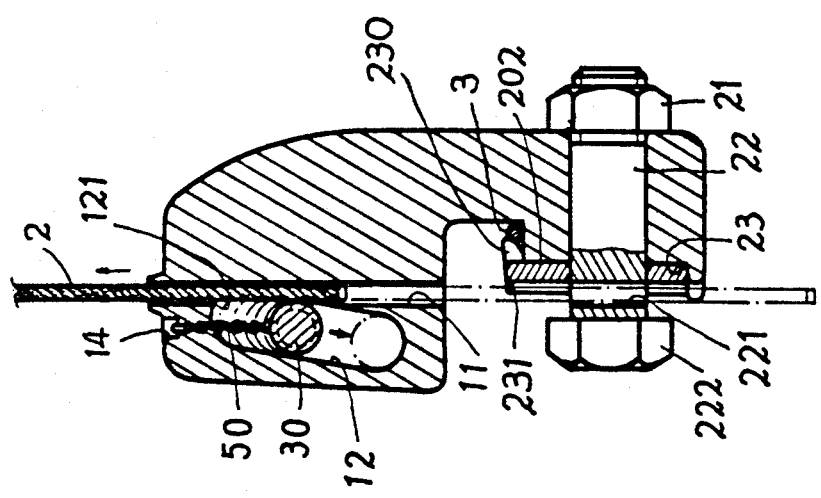
FIG. 5 shows a normal locking state of the hanger of the present invention.

The locking latch 30 generally formed as a round bar or rod includes: a pair of annular grooves 31 circumferentially recessed in two opposite side portions of the latch 30 corresponding to the two spring slots 13 recessed in the sliding block portion 10 to be respectively engaged with two hook portions 51 each hook portion 51 formed on a lower end portion of each spring member 52 of the spring means 50, a corrugate-surface portion 32 formed in a central portion of the latch 30 for frictionally retaining the brake wire 2 when the latch 30 is resiliently urged upwardly to be moved towards an interface intersected by the hanger wire hole 11 and the inclined slot 12 as shown in FIG. 5, and two opposite end portions of the latch 30 formed with elongate grooves 33 parallel to a longitudinal axis of the latch 30 to be frictionally fixed with a button member 34 on the end portion of the latch 30.

The button member 34 may be made of rubber material or plastic material, and may also be replaced with a C-shaped retainer secured on each end portion of the latch 30 to prevent a lateral withdrawing or removal from the slot 12 of the hanger 1.

The spring means 50 generally formed as an inversed U shaped includes: the horizontal bar portion 53 retained in the upper groove 14 of the sliding block portion 10, and two spring members 52 protruding downwardly from two opposite end portions of the horizontal bar portion 53 to be slidably held in the two spring slots 13 formed in the sliding block portion 10, each the spring member 52 having a hook portion 51 formed on a lower end portion of the spring member 52 to be engaged with each annular groove 31 recessed in each side portion of the locking latch 30 for normally tensioning the latch 30 for upwardly pulling the latch 30 to be limited by an uppermost slot end portion 122 of the inclined slot 12.

Figure 4:
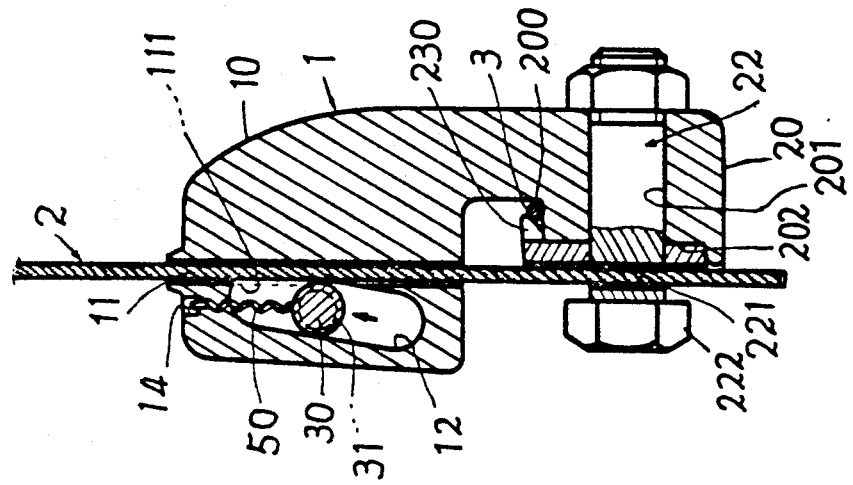
FIG. 4 is an illustration of the present invention showing an upward movement of the hanger.

When it is intended to adjust a brake force of a vehicle brake provided with the present invention, the button members 34 of the locking latch 30 are pulled downwardly as shown in FIG. 4 and the bolt 22 is released to allow an upward sliding movement of the hanger 1, the upward pulling of the hanger 1 will tension the hanging wire 3 secured with the brake shoes to thereby increase a clamping force of the brake shoes and the vehicle brake.

After properly adjusting the clamping force of the brake system, the latch 30 is released and the spring members 52 of the spring means 50 will pull the latch 30 upwardly to frictionally lock the braking wire 2 as shown in FIG. 5. The lower locking bolt 22 is then manipulated for firmly fastening a lower portion of the braking wire 2 between the head 22 and the washer 23 by the nut 21 as shown in FIG. 5, adapted for a braking operation when pulling the braking wire 2 upwardly to raise the hanging wire 3 to thereby bias the two shoes for braking a vehicle or a bicycle.

The present invention is superior to a conventional brake-force adjusting means with the following advantages:

1. The adjustment operation is very convenient, just by pulling the locking latch 30 to be disengaged from the wire 2. After releasing the pulling of the latch 30, the latch 30 will be automatically acted by the springs 52 for locking the braking wire 2 ready for any braking operation.

2. It is easier for assembling all elements in construction of the present invention. Meanwhile, the maintenance required for the present mechanism will also become easier.

3. The construction and structure of the present invention is simplified to thereby reduce the production cost.

What is claimed is:

1. A brake force adjusting means for vehicle brake comprising:
a hanger having a sliding block portion formed on an upper portion of said hanger and a hanging block portion formed on a lower portion of said hanger;
a braking wire passing through said hanger to be normally locked in said hanging block portion by a locking bolt operatively secured in said hanging block portion as packed by a retaining washer retained between a bolt head and said hanging block portion;
a hanging wire wound on said hanging block portion to be secured with a brake means for breaking a vehicle wheel;
means for adjustably locking said braking wire in said sliding block portion formed in said sliding block portion of said hanger including an adjustable locking latch resiliently and slidably held in said sliding block portion by a spring means for frictionally locking said braking wire in said sliding block portion and operatively pulled to unlock said braking wire for allowing a free movement of said sliding block portion and said hanger along said braking wire for adjusting a tension of said hanging wire between said hanging block portion and said brake means when said locking bolt is released from said hanging block portion, thereby adjusting a clamping force of the brake means of a vehicle;
said sliding block portion having: a hanger wire hole longitudinally formed through a central portion of the sliding block portion defining an inside cylindrical wall in the wire hole, an inclined slot longitudinally formed through the sliding block portion projectively forming an acute angle with the hanger wire hole and having a central inner upper portion of the inclined slot intersected with the inside cylindrical wall of the hanger wire hole, a pair of spring slots longitudinally formed in the sliding block portion communicated with the inclined slot and projectively disposed on two opposite sides of the central hanger wire hole, and an upper groove laterally recessed in an upper portion of the sliding block portion;
said locking latch generally formed as a round bar having: a pair of annular grooves circumferentially recessed in two opposite side portions of the latch corresponding to the two spring slots recessed in the sliding block portion, a corrugate-surface portion formed in a central portion of the latch for frictionally retaining the brake wire when the latch is resiliently urged upwardly to be moved towards an interface intersected by the hanger wire hole and the inclined slot, and two opposite end portions of the latch formed with elongate grooves parallel to a longitudinal axis of the latch to be frictionally fixed with a button member on the end portion of the latch; and
said spring means generally formed as an inversed U shaped having: a horizontal bar portion retained in the upper groove of the sliding block portion, and two spring members protruding downwardly from two opposite end portions of the horizontal bar portion to be slidably held in the two spring slots formed in the sliding block portion, each the spring member having a hook portion formed on a lower end portion of the spring member to be engaged with each annular groove recessed in each side portion of the locking latch for normally tensioning the latch for upwardly pulling the latch to be limited by an uppermost slot end portion of the inclined slot and for frictionally locking said braking wire in said hanger.

* * * * *